US011423446B2

(12) United States Patent
Zgliczynski et al.

(10) Patent No.: US 11,423,446 B2
(45) Date of Patent: Aug. 23, 2022

(54) SIMULTANEOUS REVIEW OF ADVERTISEMENT COMPONENTS

(71) Applicant: Facebook, Inc., Menlo Park, CA (US)

(72) Inventors: Michal Zgliczynski, Sunnyvale, CA (US); Igor Gevka, Palo Alto, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 505 days.

(21) Appl. No.: 15/366,356

(22) Filed: Dec. 1, 2016

(65) Prior Publication Data

US 2018/0158111 A1    Jun. 7, 2018

(51) Int. Cl.
*G06Q 30/02* (2012.01)

(52) U.S. Cl.
CPC ................. *G06Q 30/0276* (2013.01)

(58) Field of Classification Search
CPC ............. G06Q 30/0277; G06Q 30/0276
See application file for complete search history.

(56) References Cited

U.S. PATENT DOCUMENTS

| 8,392,246 B2* | 3/2013 | Coladonato | G06Q 30/02 705/14.26 |
| 8,639,544 B1 | 1/2014 | Flemma, Jr. | |
| 9,070,141 B2 | 6/2015 | Hua et al. | |
| 9,317,812 B2 | 4/2016 | Kabiljo et al. | |
| 10,395,321 B2 | 8/2019 | Shalita et al. | |
| 2006/0149623 A1* | 7/2006 | Badros | G06Q 30/02 705/14.66 |
| 2007/0156524 A1 | 7/2007 | Grouf et al. | |
| 2008/0040389 A1 | 2/2008 | Seth et al. | |
| 2008/0059312 A1 | 3/2008 | Gern et al. | |
| 2008/0184287 A1* | 7/2008 | Lipscomb | G06Q 30/02 725/32 |
| 2009/0076901 A1 | 3/2009 | Janos et al. | |
| 2009/0163186 A1* | 6/2009 | Gupta | G06Q 30/02 455/414.2 |
| 2010/0145762 A1 | 6/2010 | Coladonato et al. | |
| 2010/0262460 A1 | 10/2010 | Brown et al. | |
| 2011/0082824 A1* | 4/2011 | Allison | G06N 99/005 706/20 |
| 2012/0166532 A1 | 6/2012 | Juan et al. | |
| 2013/0151346 A1 | 6/2013 | Schoen | |
| 2014/0156360 A1 | 6/2014 | Shalita et al. | |
| 2014/0156566 A1 | 6/2014 | Kabiljo et al. | |

(Continued)

OTHER PUBLICATIONS

Weller, B., Calcott, L. (2012). Creating Ads and Landing Pages. In: The Definitive Guide to Google AdWords. pp. 133-134. Apress, Berkeley, CA. Retrieved on Mar. 24, 2022. Retrieved from URL: <https://doi.org/10.1007/978-1-4302-4015-0_7> (Year: 2012).*

*Primary Examiner* — James M Detweiler
*Assistant Examiner* — Monica A Mandel
(74) *Attorney, Agent, or Firm* — BakerHostetler

(57) ABSTRACT

An online advertising system provides a user interface that allows the majority of advertisers to receive an "instantaneous" decision on their ad as soon as it is created. Instead of starting the ad review process after the advertiser submits the full ad for review, each ad component and existing combination of ad components is reviewed when it is entered into the ad creation form. This method allows the system to begin time-consuming aspects of the ad review (i.e., crawling the landing page, analyzing image features) while the user is still spending time on creating the ad.

22 Claims, 4 Drawing Sheets

(56) References Cited

U.S. PATENT DOCUMENTS

| | | | |
|---|---|---|---|
| 2014/0156744 A1 | 6/2014 | Hua et al. | |
| 2014/0214524 A1* | 7/2014 | Senaratna | G06Q 30/0242 |
| | | | 705/14.41 |
| 2014/0214557 A1 | 7/2014 | Varghese et al. | |
| 2014/0214558 A1* | 7/2014 | Varghese | G06Q 30/0277 |
| | | | 705/14.73 |
| 2015/0106211 A1* | 4/2015 | Khalil | G06F 3/0481 |
| | | | 705/14.72 |
| 2018/0300745 A1* | 10/2018 | Aubespin | G06Q 30/0241 |

* cited by examiner

SIMULTANEOUS REVIEW OF ADVERTISEMENT COMPONENTS

BACKGROUND

This invention relates generally to third-party content for online systems, and in particular to reviewing third-party content in an online system.

Many online systems collect revenue by showing third-party content to their users. Presentation of third-party content allows providers to increase user exposure to their products, services, opinions, or causes, as well as potentially influence user actions. To maintain the quality of the content being provided to their users, online systems often specify review policies that third-party content must comply with to be presented by the online system. Manual review is time consuming and has limited scalability as the amount of content awaiting review increases, so online systems may rely on automatic computer-driven compliance review systems that may operate on their own or in combination with manual reviewers.

Though automatic review systems may be more scalable than manual review systems, providers can still experience a significant delay between submitting their content for review and receiving a review decision, particularly when the content requires more extensive analysis. One cause of delay is that some policies are performed on the completed third-party content, and may not be performed until the content is submitted. Even a few minutes of delay is a nuisance, and can cause a third-party to lose interest in completing the submission, postpone presentation of the content, and delay revision and resubmission of the content.

SUMMARY

An online system reviews an ad while it is in the process of being created by iteratively reviewing incomplete "preliminary ads" as an advertiser submits the ad components for the ad. An advertiser enters components of an ad in an ad creation interface that provides a plurality of sections for entry of ad components. When the advertiser enters, deletes, or modifies an ad component in the ad creation interface, the entry for that ad component is sent to the online system, which combines the ad component with previously-received ad components to create a preliminary ad for policy evaluation. The preliminary ad is then reviewed in accordance with some or all of the ad review policies of the online system to determine a review decision for the ad as currently-entered by the advertiser. Each component of the ad may be analyzed as well as features of the preliminary ad as a whole to determine whether the ad meets review requirements. Analysis of individual components may be re-used when the advertiser does not modify the component, while the additional or modified component in conjunction with the previously-entered components is evaluated.

Since the preliminary ad may be reviewed as components are added or modified, when the advertiser is finished and submits the ad, the preliminary ad generated from the last-modified component is typically already in-process and may already have completed review. Once the ad is completed and submitted by the advertiser, a review decision for the most recent preliminary ad (which matches the completed ad) is retrieved and displayed to the advertiser. This review process makes the review decision appear to be "instantaneous" from their perspective. In some cases, the review of the most recent preliminary ad may not be completed by the time that ad is completed (or may need to be forwarded for manual review), which would prevent the review decision from being displayed immediately after the ad has been completed. The advertiser may then be notified that the review is in progress, and if manual review is needed, the user would then be notified of the final review decision once the review has been completed, and may only receive a notification of the delayed response after submitting the ad. This review process is beneficial overall because the vast majority of ads can be reviewed automatically and an approval or rejection may be complete when the advertiser submits the ad, resulting for much quicker review decisions for the creators of those ads.

BRIEF DESCRIPTION OF THE DRAWINGS

Figure (FIG. 1 is a block diagram of a system environment in which an online system operates, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
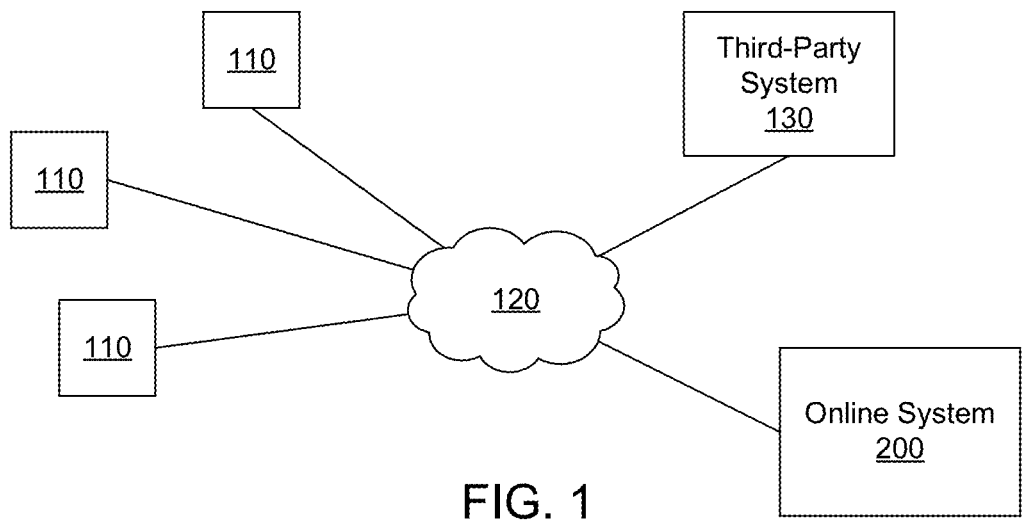

FIG. 1 is a high level block diagram of a system environment 100 for an online system 200 that receives, reviews, and presents ads to its users. When advertisers submit ad components of an ad to the online system 200, the online system 200 creates a preliminary ad from the received ad components and reviews it according to the policies of the online system 200. The system environment 100 shown by FIG. 1 comprises one or more client devices 110, a network 120, one or more third-party systems 130, and the online system 200. In alternative configurations, different and/or additional components may be included in the system environment 100. The embodiments described herein can also be adapted to online systems that are social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 200. For example, a client device 110 executes a browser application to enable interaction between the client device 110 and the online system 200 via the network 120. In another embodiment, a client device 110 interacts with the online system 200 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 200, which is further described below in conjunction with FIG. 2. In one embodiment, a third-party system 130 is operated by an advertiser seeking to display ads to users of the online system 200. In another embodiment, a third-party system 130 is an application provider communicating information describing applications for execution by a client device 110 or communicating data to client devices 110 for use by an application executing on the client device. In other embodiments, a third-party system 130 provides content or other information for presentation via a client device 110. A third-party system 130 may also communicate information to the online system 200, such as ads, content, or information about an application provided by the third-party system 130.

An advertiser (such as an operator of a third-party system 130) creates an ad through an interface provided by the online system 200. The interface can include an ad creation form with fields that each correspond to a possible component of an ad. The advertiser can send an ad component to the online system 200 by either explicit or implicit actions. Explicit actions can include uploading an image to the online system 200, or otherwise selecting an interface element associated with submitting that ad component to the online system 200. Implicit actions can include entering information into a field of an ad creation form.

Figure 2:
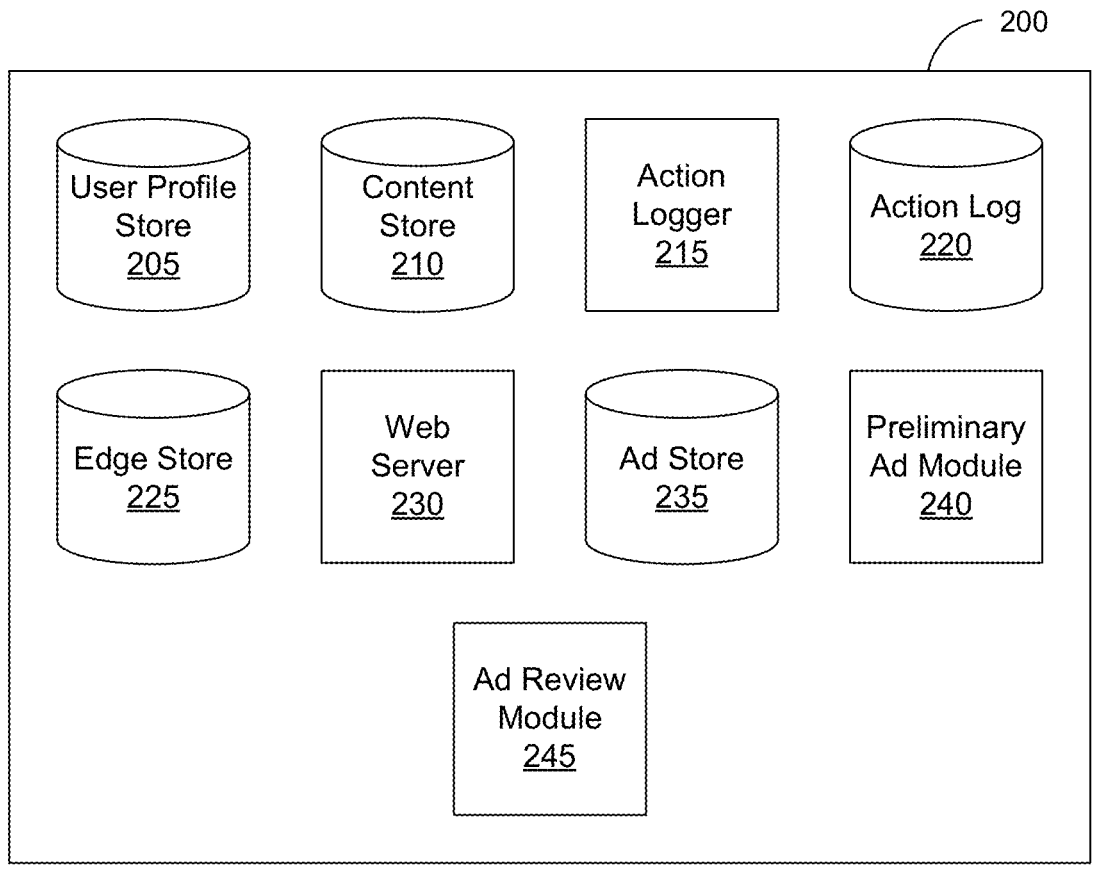
FIG. 2 is a block diagram of an online system, according to one embodiment.

FIG. 2 is an example block diagram of an architecture of the online system 200. The online system 200 shown in FIG. 2 includes a user profile store 205, a content store 210, an action logger 215, an action log 220, an edge store 225, a web server 230, an ad store 235, a preliminary ad module 240, and an ad review module 245. In other embodiments, the online system 200 may include additional, fewer, or different components for various applications. Conventional components such as network interfaces, security functions, load balancers, failover servers, management and network operations consoles, and the like are not shown so as to not obscure the details of the system architecture.

Each user of the online system 200 is associated with a user profile, which is stored in the user profile store 205. A user profile includes declarative information about the user that was explicitly shared by the user and may also include profile information inferred by the online system 200. In one embodiment, a user profile includes multiple data fields, each describing one or more attributes of the corresponding user of the online system 200. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 200 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 200, user profiles may also be stored for entities such as businesses or organizations. This allows an entity to establish a presence on the online system 200 for connecting and exchanging content with other social networking system users. The entity may post information about itself, about its products or provide other information to users of the online system 200 using a brand page associated with the entity's user profile. Other users of the online system 200 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system 200 users may create objects stored by the content store 210, such as status updates, photos tagged by users to be associated with other objects in the online system 200, events, groups or applications. In some embodiments, objects are received from third-party systems 130 separate from the online system 200. In one embodiment, objects in the content store 210 represent single pieces of content, or content "items." Hence, users of the online system 200 are encouraged to communicate with each other by posting text and content items of various types of media through various communication channels. This increases the amount of interaction of users with each other and increases the frequency with which users interact within the online system 200.

The action logger 215 receives communications about user actions internal to and/or external to the online system 200, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 200 to track user actions on the online system 200, as well as actions on third-party systems 130 that communicate information to the online system 200. Users may interact with various objects on the online system 200, and information describing these interactions is stored in the action log 220. Examples of interactions with objects include: commenting on posts, sharing links, and checking-in to physical locations via a mobile device, accessing content items, and any other interactions. Additional examples of interactions with objects on the online system 200 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 200 as well as with other applications operating on the online system 200. In some embodiments, data from the action log 220 is used to infer interests or preferences of a user, augmenting the interests included in the user's user profile and allowing a more complete understanding of user preferences.

The action log 220 may also store user actions taken on a third-party system 130, such as an external website, and communicated to the online system 200. For example, an e-commerce website that primarily sells sporting equipment at bargain prices may recognize a user of the online system 200 through a social plug-in enabling the e-commerce website to identify the user of the online system 200. Because users of the online system 200 are uniquely identifiable, e-commerce websites, such as this sporting equipment retailer, may communicate information about a user's actions outside of the online system 200 to the online system 200 for association with the user. Hence, the action log 220 may record information about actions users perform on a third-party system 130, including webpage viewing histories, advertisements that were engaged, purchases made, and other patterns from shopping and buying.

In one embodiment, an edge store 225 stores information describing connections between users and other objects on the online system 200 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 200, such as expressing interest in a page on the online system, sharing a link with other users of the online system 200, and commenting on posts made by other users of the online system 200. Users and objects within the online system 200 can be represented as nodes in a social graph that are connected by edges stored in the edge store.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 200, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 200 over time to approximate a user's affinity for an object, interest, and other users in the online system 200 based on the actions performed by the user. A user's affinity may be computed by the online system 200 over time to approximate a user's affinity for an object, interest, and other users in the online system 200 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 230 links the online system 200 via the network 120 to the one or more client devices 110, as well as to the one or more third-party systems 130. The web server 230 serves web pages, as well as other web-related content, such as JAVA®, FLASH®, XML and so forth. For example, the web server 230 can serve web-related content that includes an ad creation form user interface (like that of FIG. 5) with fields corresponding to ad components. The web server 230 may receive and route messages between the online system 200 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, WEBOS® or RIM®.

The advertisement store ("ad store") 235 of the online system 200 stores information describing ads. In some embodiments, ads are represented as advertisement objects ("ad objects") that store information describing ads provided to the online system 200 from one or more advertisers. Ads include content that can be presented to a user, such as text, image, audio, or video. In various embodiments, an ad can also include a landing page specifying a network address that a user is directed to when the ad is accessed. An ad may be created by an advertiser through an interface provided by the online system 200, like that of FIG. 5. Alternatively, one or more ads may be created using an application programming interface (API).

An ad object may include one or more targeting criteria that specifies one or more characteristics of users eligible to be presented with content in the ad object. For example, targeting criteria specify characteristics of user profiles, edges, or actions associated with users. To identify eligible users, the online system 200 determines which users have the characteristics specified by the targeting criteria. Hence, the targeting criteria allow advertisers to identify groups of users matching specific targeting criteria, simplifying subsequent distribution of content to groups of users.

In one embodiment, the targeting criteria may specify actions or types of connections between a user and another user or object of the online system 200. The targeting criteria may also specify interactions between a user and objects performed external to the online system 200, such as on a particular third-party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an ad object. As another example, targeting criteria may identify users having a connection to another user or object or having a particular type of connection to another user or object.

In some embodiments, ads are divided into ad components that correspond to various parts of the ad. Ad components may be associated with types that enable the system to better handle attributes of the various ad components. These types can include, for example, headline ad components, landing page ad components, image ad components, text ad components, and targeting criteria ad components. Some ad components (i.e., images or other visual content) may be represented by a signature or hash that requires less storage than the ad component itself, while other ad components (i.e., headlines, body text or other textual content) may be represented textually.

One or more advertisement requests ("ad requests") are also included in the ad store 235. An ad request includes ad content (i.e., an ad) and a bid amount. The bid amount is used to determine an expected value, such as monetary compensation, that the online system 200 receives from the advertiser if the ad results in an advertiser-specified user action, such as a conversion action. A user action may be a user viewing the ad (an impression), or a more active action, such as a user interacting with the ad or buying a product advertised in the ad. For example, the bid amount relates to a monetary amount that the online system 200 receives from the advertiser if the ad is displayed and the expected value is determined by multiplying the bid amount by a probability of the ad being accessed. In some cases, the amount paid to the online system 200 is not the bid amount for an ad that has won an auction, but is the next highest bid amount of the next highest ranked ad in the auction.

The preliminary ad module 240 creates preliminary ads from one or more ad components received from the advertiser. A preliminary ad is a representation of an ad prior to its submission by the advertiser. In some embodiments, a preliminary ad is represented as an ad object and treated like a complete ad for reviewing purposes. In other embodiments, a preliminary ad is represented by a different data structure. A preliminary ad may be a list with entries corresponding to the various ad components or types of ad components it contains. For example, a preliminary ad may be represented as {Headline, Landing Page, Image, Body Text, Targeting Criteria}. In some embodiments, each list entry corresponds to an ad component that has been received, and the list may not include an entry for component types that have not been provided for the ad. In other embodiments, each list entry corresponds to a type of ad component that the preliminary ad could include and placeholders are inserted for ad components that have not yet been received. For example, a preliminary ad that includes all of the ad components besides the text ad component could be represented by {Headline, Landing Page, Image, Targeting Criteria}, which has a placeholder for the missing text ad component, or {Headline, Landing Page, Image, Targeting Criteria}, which does not have a placeholder and simply omits the missing body text ad component. The preliminary ad module 240 and preliminary ads are discussed in further detail with respect to FIGS. 4 and 5.

The ad review module 245 analyzes ads (and preliminary ads) to determine whether they satisfy one or more policies of the online system 200 before they are presented to users of the online system 200. These policies of the online system are described by component rules and ad rules. Component rules describe criteria for determining whether a particular ad component of the ad satisfies the one or more policies, while ad rules describe criteria for determining whether the ad as a whole satisfies the one or more policies of the online system 200. Thus, these rules may evaluate the ads at different levels of specificity—as individual ad components and as an ad made up of an entire set of ad components.

During the review process the ad review module 245 may tag individual ad components with various tags indicating subject matter or types of content in the ad components. An ad rule may assess the tags and evaluate the relationship between different components of the ad when evaluating the ad itself to determine whether the ad is permissible. The ad rule may dictate that particular tags cannot be combined with other particular tags or with particular ad components. For example, an ad component that has been determined to relate to alcohol (e.g., images of alcohol bottles, text referencing alcohol, or an alcohol brand's website as a landing page) may be tagged as "ALCOHOL." An ad rule may require that ads containing an ad component with an "ALCOHOL" tag must be combined with permissible targeting criteria, such as to certain users exceeding an age threshold (e.g., those over 21 years old).

Figure 5:
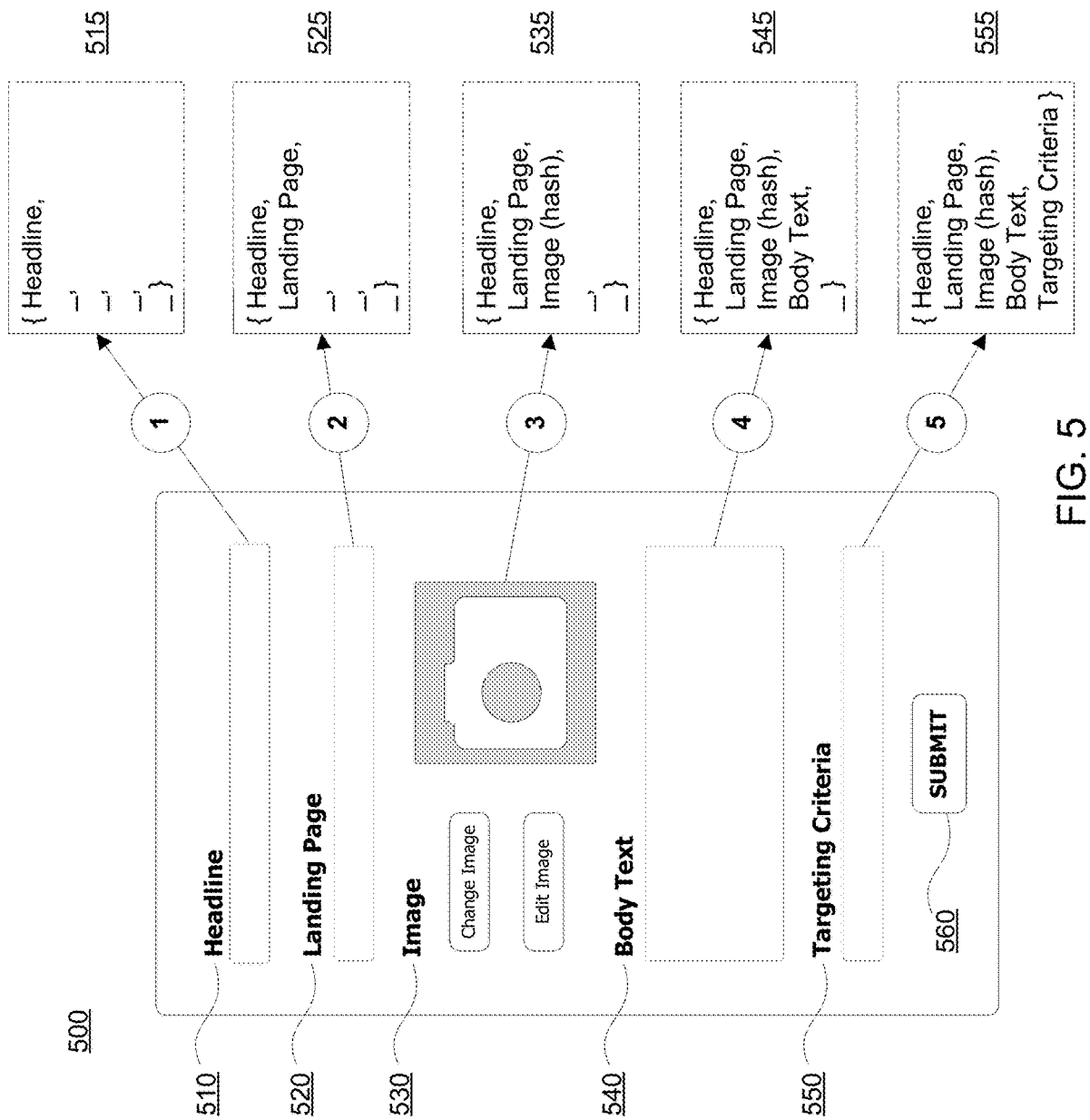
FIG. 5 is an ad creation form user interface of an online system, according to one embodiment.

Different types of or combinations of ad components may require different lengths of time to review depending on what the review entails and how different features or characteristics of the ad component are determined. For example, for an ad component specifying a landing page, the online system may retrieve the landing page and related content on the page, and then analyze content. This content analysis may include categorizing the images and text on the page, converting images to text (e.g., via text recognition), identifying links to other content on the page, and other analytics to generate tags for the component. This process is relatively computationally intensive and relies on responses from external systems. Similarly, images provided for inclusion in the ad can be reviewed based on image feature analysis, which is also computationally intensive. Text analysis, on the other hand, may be less computationally intensive. Because of the different lengths of time that may be needed to fully review various components, the online system 200 may organize the ad creation user interface such that (or recommend that) ad components requiring a longer review time are input earlier in the ad creation process. Ad creation form 500 of FIG. 5 is organized to facilitate this input order.

In some embodiments, ad components are compared to previously-approved ad components to determine if the ad components being reviewed match or are similar to ad components that have previously been approved. This method is further described in U.S. patent application Ser. No. 13/756,357, filed on Jan. 31, 2013, which is hereby incorporated by reference.

The ad review module 245 may use information from previous reviews for preliminary ad reviews, which evaluate whether entire ads are compliant with the policies of the online system 200. Specifically, when an ad component in a preliminary ad is modified (e.g., updating, deleted or added), the online system 200 may not need to fully review the entire preliminary ad depending on which ad components have remained unchanged. For example, a preliminary ad review for a preliminary ad consisting of Component A, an image ad component showing a whiskey bottle, and Component B, a targeting criteria ad component specifying "women 15-25" may have been determined to be noncompliant based on an ad rule that image ad components tagged as "ALCOHOL" cannot be targeted to users under the age of 21 because Component A was tagged as "ALCOHOL," and Component B was tagged as "UNDER 21." If the preliminary ad is updated to include Component C, a body text ad component stating "Buy whiskey!," but keeps Components A and B unchanged, the online system 200 would not need to fully review the updated preliminary ad because the review of the preliminary ad before the update determined that it was noncompliant and the ad components that made the preliminary ad noncompliant are also present in the updated preliminary ad.

Method for Synchronous Ad Review

Figure 3:
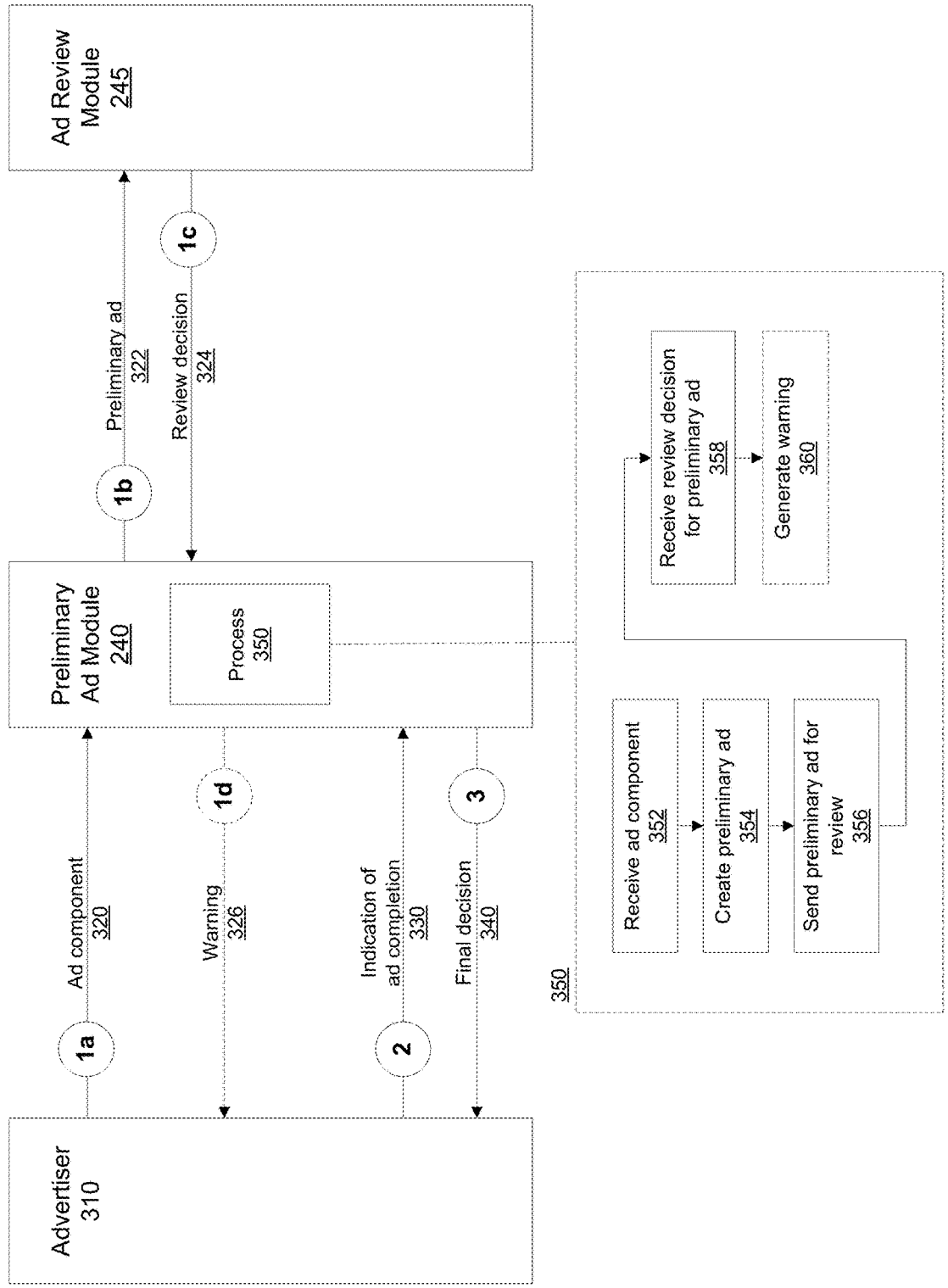
FIG. 3 illustrates the flow of data between an advertiser and modules of an online system, according to one embodiment.

FIG. 3 illustrates the flow of information between an advertiser 310 and modules of the online system 200 during a synchronous ad review process, according to one embodiment. This synchronous ad review process enables creation of and review for a preliminary ad when new or revised ad components are received, such that the approval of a preliminary ad can be readily provided to an advertiser 310, and components can be reviewed as they are provided, as well as application of the ad rules to the preliminary ad itself. Preliminary ads comprise the ad components received by the online system 200 during a particular ad creation process (e.g., a single instance of an ad creation form interface). As the online system 200 receives ad components from the advertiser 310, it creates preliminary ads that it sends for review. Specifically, when the advertiser 310 adds, deletes, edits, or otherwise modifies an ad component, the online system 200 creates an updated preliminary ad based on the modified ad component and sends the updated preliminary ad for review.

The ad review process begins when the online system 200 first receives an ad component for a new ad. The preliminary ad module 240 creates a data structure to store received ad components for the new ad. When the advertiser 310 sends an ad component 320 to the online system 200, the preliminary ad module 240 generates a preliminary ad and obtains a review decision for the preliminary ad via process 350. This process 350 begins with receipt 352 of the ad component 320 from the advertiser 310.

What constitutes "receipt" 352 of that ad component 320 can vary based on the type of the ad component 320. A text-based field may be "received" 352 by the online system 200 when a single character or a predetermined number of characters are entered into the field. Additionally or alternatively, the online system may receive 352 new ad components based on how many are additional or different characters (or words, phrases, sentences) are entered into the field, or how long the field has remained unchanged. For example, entering "Kiwi birds" into a body text field may result in a body text ad component "Kiwi birds" being submitted to the online system 200 because entry of ten characters constitutes receipt of a body text ad component. If the body text ad component is then received every ten characters, "Kiwi birds need your" would be the next ad component received. If the body text ad component is received based on completion of a number (e.g., one) of sentences in the field, the body text ad component would not be received until the field reads "Kiwi birds need your help." For a body text ad component that is received based on how long the field stays unchanged (i.e., one second), if the advertiser 310 pauses for a second after entering "need," the next body text ad component received by the online system would be "Kiwi birds need." In some embodiments, several methods of determining "receipt" of an ad component are combined.

Once the ad component 320 has been received 352 by the preliminary ad module 240, the ad component 320 is used to create 354 a preliminary ad. If the ad component is a modification to a previously-received ad component, the most recently-received ad component 320 replaces the previously-received ad component in the preliminary ad. After the preliminary ad is created 354, the preliminary ad module 240 sends 356 the preliminary ad to the ad review module 245 for review, as described in conjunction with FIG. 2. After the review of the preliminary ad is completed, the preliminary ad module 240 receives 358 a review decision 324 from the ad review module 245. In some embodiments, the review decision 324 may be stored by the preliminary ad module 240 in association with the preliminary ad that underwent the review.

In some embodiments, if the review decision 324 indicates that the preliminary ad did not pass the review, the preliminary ad module 240 may generate 360 a warning 326 that is sent to the advertiser 130 in order to allow them to address problems with the ad components that make up the preliminary ad before they have completed and submitted the ad. The warning 326 can specify which ad components or combination of ad components do not comply with ad review policies of the online system 200, or which policies have been violated. The warning 326 can be conveyed to the advertise 310 via pop-up text, highlighting, changing text color, or by another visual distinction. Additionally, the online system 200 may provide instructions on how to fix the problem that resulted in the warning, or offer to automatically fix the problem. For example, if the ad is noncompliant because one ad component is tagged as "ALCOHOL" and the targeting criteria is tagged as "UNDER 21," the online system 200 display a "Fix Targeting" button that adjusts the targeting criteria to exclude users under 21 upon its activation. In one embodiment, the online system 200 may automatically fix non-compliance issues without confirmation from the advertiser 310.

Upon receipt of an indication 430 noting that the advertiser 310 has completed its ad creation process, the preliminary ad module 240 retrieves the review decision 324 for the most recently submitted preliminary ad 322, if available. The indication 430 is usually triggered by an explicit indication from the advertiser 310 to place the ad, such as selection of a "Submit Ad" button, and may also be triggered by an implicit action. If the most recent review decision 324 is available, the preliminary ad module 240 sends it to the advertiser 310 as the final decision 340 for the complete ad (which matches the most recent preliminary ad). If the review decision 324 for the most recent preliminary ad is not available, the preliminary ad module 240 sends the advertiser 310 an alert indicating that they will receive the review decision 324 at a later time. Delays in review decisions 324 may originate from a designation for an additional manual review, from insufficient time to process and complete the review of the most recent preliminary ad. If the preliminary ad module 240 anticipates that the review decision 324 will be available soon, the online system 200 may also display a "loading" page until the review decision is available before displaying the review decision 324.

Figure 4:
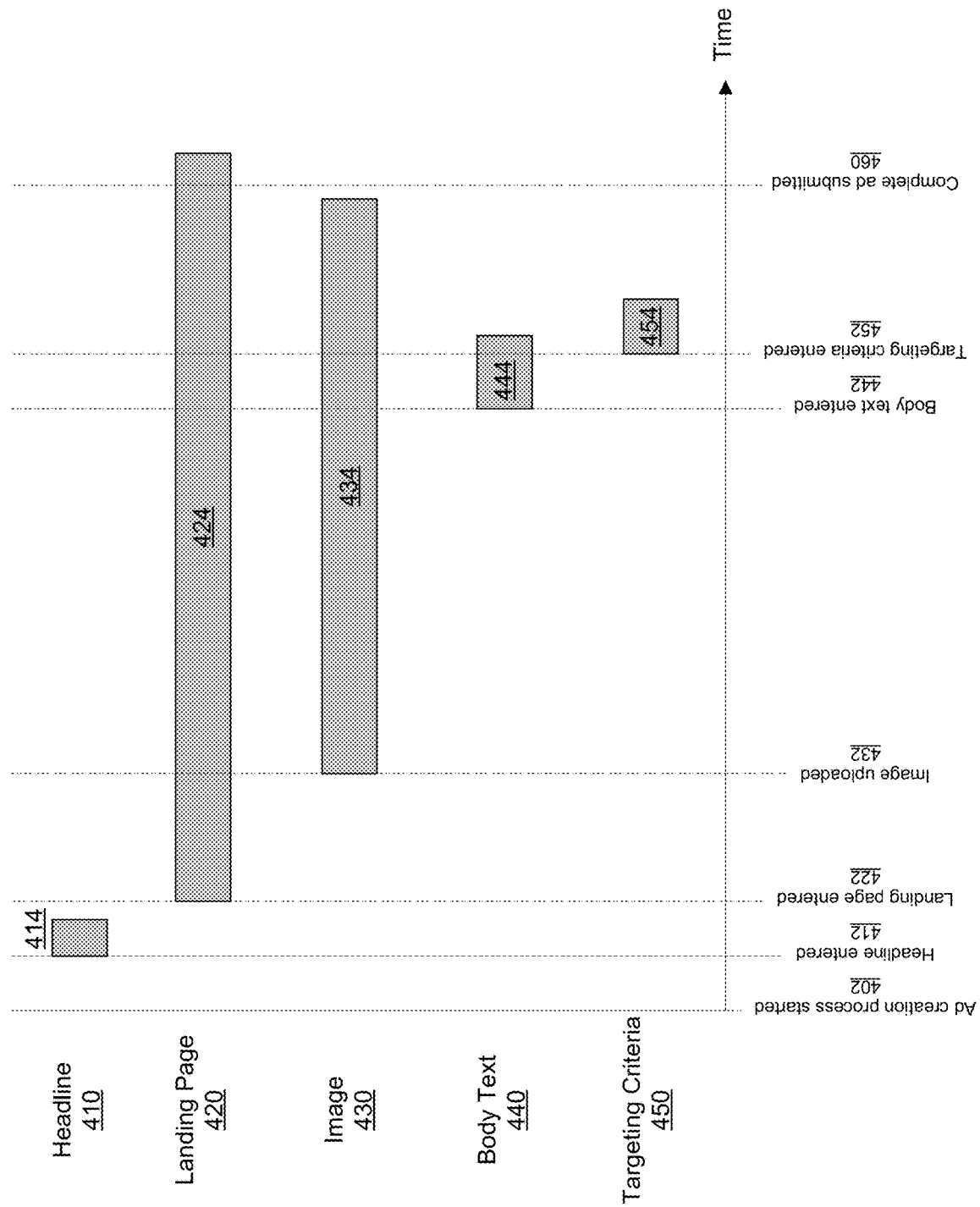
FIG. 4 is a graph showing review times of multiple ad components in an ad creation process, according to one embodiment.

FIG. 4 is a timeline illustrates the lengths of time required to review multiple ad components in an example ad creation process, according to one embodiment. The example ad of FIG. 4 includes five ad components, each of which may require a different length of time to review, regardless of when the review begins. Headline 410 has review time 414, landing page 420 has review time 424, image 430 has review time 434, body text 440 has review time 444, and targeting criteria 450 has review time 454. In this example, the landing page 420 requires the longest review time 424. However, in some situations a different ad component (like image 430) could require the longest review time based on what the review entails.

In a conventional ad creation process, the ad (including each of its ad components) would only be reviewed after the ad has been submitted 460, regardless of when any of the components are entered into an ad creation interface of the online system 200. Thus, the review times 414, 424, 434, 444, or 454 would be measured starting from when the complete ad was submitted 460.

In this ad creation process, each ad component is submitted for review as soon as it is received by the online system 200. In this example, an ad component is considered to have been received by the online system 200 once it is entered in full into an ad creation form of the online system 200. However, as discussed with respect to step 352 of sub-process 350 in FIG. 3, what constitutes receipt of an ad component may include criteria other than complete entry by the advertiser.

The ad creation process starts at time 402. Headline 410 is submitted for review at time 412 corresponding to the headline 410 being entered into the ad creation form. Landing page 420 is submitted for review at time 422 corresponding to the landing page 420 being entered into the ad creation form. Image 430 is submitted for review at time 432 corresponding to the image 430 being entered into the ad creation form. Body text 440 is submitted for review at time 442 corresponding to the body text 440 being entered into the ad creation form. Targeting criteria 450 is submitted for review at time 452 corresponding to the targeting criteria 450 being entered into the ad creation form.

At time 460 when the complete ad is submitted, a final review decision may be presented to the advertiser, as is described with respect to 340 of FIG. 3. However, in some cases including this example, the review of each ad component may not be completed by time 460, so no review decision is available. Though this example only discusses the review of individual ad components, this process can also be applied to combinations of ad components that are reviewed as soon as every ad component in that combination are available to the online system 200.

FIG. 5 is an ad creation form 500 user interface of the online system 200, according to one embodiment. The ad creation form 500 includes fields and buttons associated with different ad components. Specifically, ad creation form 500 comprises a "Headline" section 510, a "Landing Page" section 520, an "Image" section 530, a "Body Text" section 540, and a "Targeting Criteria" section 550. The ad creation form additionally includes a means for submitting the completed ad, such as a "SUBMIT" button 560. In some embodiments, the ad creation form 500 is organized such that fields associated with components that are more likely to take longer to review (e.g., landing page and image because they are relatively computationally intensive) are positioned towards the top of the ad creation form 500. In some embodiments, the ad creation form 500 is shown over a series of screens rather than on a single screen.

An advertiser using the ad creation form 500 may choose to fill out some or all of the presented fields. In this example, the advertiser fills out all of the fields of the ad creation form 500, resulting in a final preliminary ad that includes ad components of each type. As entries are made into the fields of the ad creation form 500, the online system 200 receives ad components and generates preliminary ads. In the example of FIG. 5, the headline field 510 is completed first, generating preliminary ad 515; the landing page field 520 is completed second, generating preliminary ad 525; the image field 530 is completed third, generating preliminary ad 535; the body text field 540 is completed fourth, generating preliminary ad 545; and the targeting criteria field 550 is completed last, generating preliminary ad 555. In other embodiments, the fields may be completed in a different order. As discussed with respect to preliminary ad module 240 in FIG. 2, the lists may contain placeholders for empty fields as shown in this figure, or the lists may simply omit empty fields. After completing the applicable fields, the advertiser indicates that the ad is complete by, for example, selecting a "SUBMIT" button 560.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a plurality of ad components from an advertiser during an ad creation process through an online system;
   receiving a modification to one or more ad components of the plurality of ad components;
   creating, at the online system during the ad creation process based on the plurality of ad components, a preliminary ad comprising the plurality of ad components and one or more placeholder components, each placeholder component corresponding to an unreceived ad component, and wherein each of the plurality of ad components is associated with different corresponding types of components organized in an input order in the preliminary ad based on determined different review times of each respective component of the types of components;
   inputting at least one of the types of components determined as comprising a longest review time, among the different review times, first in the order;
   reviewing, during the ad creation process, the preliminary ad according to a first policy of the online system, wherein compliance with the first policy is based on an evaluation of a relationship between the types of components, of the preliminary ad, relative to each other satisfying predetermined criteria, the review performed according to the different review times and results in a review decision for the preliminary ad based on the first policy of the online system and the plurality of ad components; and
   responsive to receiving an indication that the advertiser completed the ad creation process, presenting the advertiser with the review decision.

2. The method of claim 1, wherein the modification comprises an addition of an ad component to the plurality of ad components.

3. The method of claim 1, wherein the modification comprises a deletion of an ad component of the plurality of ad components.

4. The method of claim 1, wherein the modification comprises a change to content of an ad component of the plurality of ad components.

5. The method of claim 1, wherein the first policy depends on multiple ad components of the plurality of ad components.

6. The method of claim 1, further comprising:
   responsive to the review decision for the preliminary ad being a rejection, displaying a warning to the advertiser.

7. The method of claim 1, wherein the modification is received responsive to determining that an image has been uploaded to the online system.

8. The method of claim 1, wherein the modification is received responsive to determining that a threshold number of new characters have been entered into a text field of an online form associated with the ad creation process, the text field associated with an ad component of the plurality of ad components.

9. The method of claim 1, wherein the modification is received responsive to determining that a threshold number of different characters have been entered into a text field of an online form associated with the ad creation process, the text field associated with an ad component of the plurality of ad components.

10. The method of claim 1, wherein the modification is received responsive to determining that an entry in a text field of an online form associated with the ad creation process has remained unchanged for a predetermined amount of time, the text field associated with an ad component of the plurality of ad components.

11. The method of claim 10, wherein the predetermined amount of time is determined based on a type of the ad component.

12. The method of claim 1, further comprising:
    receiving a second modification to one or more other ad components of the plurality of ad components;
    updating the preliminary ad based on the second modification; and
    responsive to updating the preliminary ad based on the second modification, reviewing the preliminary ad according to the first policy of the online system,
    wherein the review decision for the preliminary ad is updated based on results of the review after the second modification.

13. The method of claim 1, wherein the compliance with the first policy is further based on information associated with one or more previous ad reviews.

14. The method of claim 1, wherein satisfying comprises satisfying the predetermined criteria of the preliminary ad.

15. A non-transitory computer-readable medium comprising instructions that when executed by a processor cause the processor to perform steps comprising:
    receiving a plurality of ad components from an advertiser during an ad creation process through an online system;
    receiving a modification to one or more ad components of the plurality of ad components;
    creating, at the online system during the ad creation process based on the plurality of ad components, a preliminary ad comprising the plurality of ad components and one or more placeholder components, each placeholder component corresponding to an unreceived ad component, and wherein each of the plurality of ad components is associated with different corresponding types of components organized in an input order in the preliminary ad based on determined different review times of each respective component of the types of components;
    inputting at least one of the types of components determined as comprising a longest review time, among the different review times, first in the order;
    reviewing, during the ad creation process, the preliminary ad according to a first policy of the online system, wherein compliance with the first policy is based on an evaluation of a relationship between the types of components, of the preliminary ad, relative to each other satisfying predetermined criteria, the review performed according to the different review times and results in a review decision for the preliminary ad based on the first policy of the online system and the plurality of ad components; and responsive to receiving an indication that the advertiser completed the ad creation process, presenting the advertiser with the review decision.

16. The non-transitory computer-readable medium of claim 15, wherein the modification comprises an addition of an ad component to the plurality of ad components.

17. The non-transitory computer-readable medium of claim 15, wherein the modification comprises a deletion of an ad component of the plurality of ad components.

18. The non-transitory computer-readable medium of claim 15, wherein the modification comprises a change to content of an ad component of the plurality of ad components.

19. The non-transitory computer-readable medium of claim 15, the steps further comprising:

responsive to the review decision for the preliminary ad being a rejection, displaying a warning to the advertiser.

20. The non-transitory computer-readable medium of claim 15, wherein the modification is received responsive to determining that a threshold number of new characters have been entered into a text field of an online form associated with the ad creation process, the text field associated with an ad component of the plurality of ad components.

21. The non-transitory computer-readable medium of claim 15, wherein the modification is received responsive to determining that a threshold number of different characters have been entered into a text field of an online form associated with the ad creation process, the text field associated with an ad component of the plurality of ad components.

22. The non-transitory computer-readable medium of claim 15, wherein the modification is received responsive to determining that an entry in a text field of an online form associated with the ad creation process has remained unchanged for a predetermined amount of time, the text field associated with an ad component of the plurality of ad components.

* * * * *